United States Patent
Woodell et al.

(10) Patent No.: US 7,598,902 B1
(45) Date of Patent: Oct. 6, 2009

(54) ADAPTIVE WEATHER RADAR DETECTION SYSTEM AND METHOD USED IN CONTINENTAL AND MARITIME ENVIRONMENTS

(75) Inventors: Daniel L. Woodell, Robins, IA (US); Roy E. Robertson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/256,845

(22) Filed: Oct. 24, 2005

Related U.S. Application Data

(63) Continuation of application No. 10/631,253, filed on Jul. 31, 2003.

(51) Int. Cl.
*G01S 13/95* (2006.01)
*G01S 7/04* (2006.01)

(52) U.S. Cl. ............... 342/26 B; 342/26 R; 342/73; 342/74; 342/75; 342/89; 342/91; 342/159; 342/175; 342/176; 342/195; 342/357.01; 342/357.06

(58) Field of Classification Search ...... 342/26 R–26 D, 342/73–81, 118, 159–162, 165–176, 179–184, 342/195, 89–103, 357.01–357.17
See application file for complete search history.

(56) References Cited

U.S. PATENT DOCUMENTS

| | | | |
|---|---|---|---|
| 3,964,064 A | 6/1976 | Brandao et al. | |
| 4,283,725 A | 8/1981 | Chisholm | |
| 4,435,707 A | 3/1984 | Clark | |
| 4,555,703 A | 11/1985 | Cantrell | |
| 4,613,938 A | 9/1986 | Hansen et al. | |
| 4,835,536 A | 5/1989 | Plesinger et al. | |
| 5,077,558 A | 12/1991 | Kuntman | |
| 5,198,819 A * | 3/1993 | Susnjara | 342/26 B |
| 5,311,183 A | 5/1994 | Mathews et al. | |
| 5,311,184 A | 5/1994 | Kuntman | |
| 5,945,926 A | 8/1999 | Ammar et al. | |
| 6,154,169 A * | 11/2000 | Kuntman | 342/74 |
| 6,177,873 B1 | 1/2001 | Cragun | |
| 6,201,494 B1 * | 3/2001 | Kronfeld | 342/26 R |
| 6,236,351 B1 * | 5/2001 | Conner et al. | 342/26 B |
| 6,240,369 B1 | 5/2001 | Foust | |
| 6,388,607 B1 * | 5/2002 | Woodell | 342/26 B |

(Continued)

FOREIGN PATENT DOCUMENTS

EP    1329738 A1 *   7/2003

(Continued)

OTHER PUBLICATIONS

"The Vertical Profile of Radar Reflectivity and Convective Cells: A Strong Indicator of Storm Intensity and Lightning Probability?" E. Zipser and K. Lutz; America Meteorological Society, 1994, pp. 1751-1759.

*Primary Examiner*—Bernarr E Gregory
(74) *Attorney, Agent, or Firm*—Daniel M. Barbieri

(57) ABSTRACT

A method of detecting weather using a weather radar onboard an aircraft. A range is selected at which weather is to be detected. A tilt angle of the weather radar is changed to detect weather below an altitude of the aircraft at a selected range when the selected range includes a maritime environment.

20 Claims, 2 Drawing Sheets

U.S. PATENT DOCUMENTS

| | | |
|---|---|---|
| 6,388,608 B1 | 5/2002 | Woodell et al. |
| 6,424,288 B1 | 7/2002 | Woodell |
| 6,456,226 B1 | 9/2002 | Zheng et al. |
| 6,512,476 B1 | 1/2003 | Woodell |
| 6,597,305 B2 | 7/2003 | Szeto et al. |
| 6,603,425 B1 | 8/2003 | Woodell |
| 6,614,382 B1 * | 9/2003 | Cannaday et al. ......... 342/26 R |
| 6,650,275 B1 | 11/2003 | Kelly et al. |
| 6,667,710 B2 | 12/2003 | Cornell et al. |
| 6,670,908 B2 | 12/2003 | Wilson et al. |
| 6,677,886 B1 | 1/2004 | Lok |
| 6,690,317 B2 | 2/2004 | Szeto et al. |
| 6,741,203 B1 | 5/2004 | Woodell |
| 2003/0016156 A1 | 1/2003 | Szeto et al. |

FOREIGN PATENT DOCUMENTS

| | | |
|---|---|---|
| FR | 2658617 | 8/1991 |

* cited by examiner

ADAPTIVE WEATHER RADAR DETECTION SYSTEM AND METHOD USED IN CONTINENTAL AND MARITIME ENVIRONMENTS

CROSS-REFERENCE TO RELATED APPLICATIONS

This application is a continuation of prior U.S. patent application Ser. No. 10/631,253, filed Jul. 31, 2003.

BACKGROUND OF THE INVENTION

Conventionally, pilots use weather radar to detect and then avoid hazardous weather. Conventional radar systems may produce the desired results only in a limited environment. Typically, airborne threshold systems are traceable to ground-based weather radar thresholds for wet precipitation generated from convective weather. Such thresholds have been set in accordance with reflectivity data which is applicable to typical convective weather systems in continental environments but not necessarily in maritime regions. It has been observed that maritime storm reflectivity differs substantially from continental storm reflectivity. Research by Zipser and Lutz in "The Vertical Profile of Radar Reflectivity of Convective Cells: A Strong Indicator of Storm Intensity and Lightning Probability?", Monthly Weather Review of the American Meteorological Society, 1751-1759 (August 1994), characterizes the differences in reflectivity of continental versus maritime convective storms. Below the freezing altitude, the research shows that maritime storm reflectivity averages 8 dB below that of continental storms with peak maritime reflectivities observed at near sea level while peak continental reflectivities are observed at about the 8000 foot region. Above the freezing altitude, the reflectivity of maritime cells falls off at an average rate of 1.4 dB per 1000 feet versus the falloff rate of 0.45 dB per 1000 feet for continental storms. Peak reflectivity differences between the two populations of cells peak at about the 23 dB range at about 28,000 feet.

Conventionally, radar thresholds map radar return strength to a display with color representing rain rate or alternatively a weather threat assessment level. The threat level has been previously described as primarily a function of radar reflectivity and a weaker function of temperature, altitude, and latitude. However, because of the difference in maritime and continental weather, the conventional mapping while useful, does not completely allow successful operation of aircraft in maritime regions. The lower reflectivity of maritime weather does not allow for successful detection of significant convective weather systems during flight. Further, because of the ability of aircraft flying over maritime regions to circumnavigate storm systems, if recognized, it would therefore be desirable to provide an airborne radar system which has the ability to more accurately detect and report the existence and/or characteristics of maritime storms when operating in maritime environments and continental storms when operating in continental environments. It may be possible for a pilot operating radar manually to be able to compensate for the differences in maritime and continental weather as each pilot becomes familiar with the environment. However, knowledge by the pilot must be acquired, and further, an increase in pilot workload is also necessitated. Therefore, there is a need for an automated system of adjusting radar thresholds based on the presence of maritime or continental weather environments.

Often, the reflectivity of maritime weather systems may be lower than that which may be detected with the conventionally used on-board radar hardware. Accordingly, there is a need for an automated system that adjusts radar tilt, to improve detectability of weather systems in maritime environments.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

An example of the invention relates to a method of adapting weather radar thresholds. The method comprises generating a location from a location sensor, retrieving information representative of a weather type from a database, based on the location, and adjusting, automatically, the threshold for a radar display based on the information.

Another example of the invention relates to a method of adapting weather radar thresholds. The method comprises determining the type of weather, based on location of the radar, and adjusting, automatically, the weather radar display to display weather hazards, based on the type of weather.

Yet another example of the invention relates to an airborne weather radar carried on an aircraft. The radar comprises a radar antenna system carried on the aircraft. The radar also comprises a location determining system, configured to provide location of information of the aircraft and a database comprising weather type information relating to location, and a processing system accessing the database and adjusting the weather radar display thresholds based on weather type information from the database that is based on the location of the aircraft.

Yet still another example of the invention relates to a method of adapting weather radar tilt angle, the weather radar being on-board an aircraft. The method includes determining a range at which the weather is detected. The method also includes determining automatically a radar tilt angle, the radar tilt angle being based on the range.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
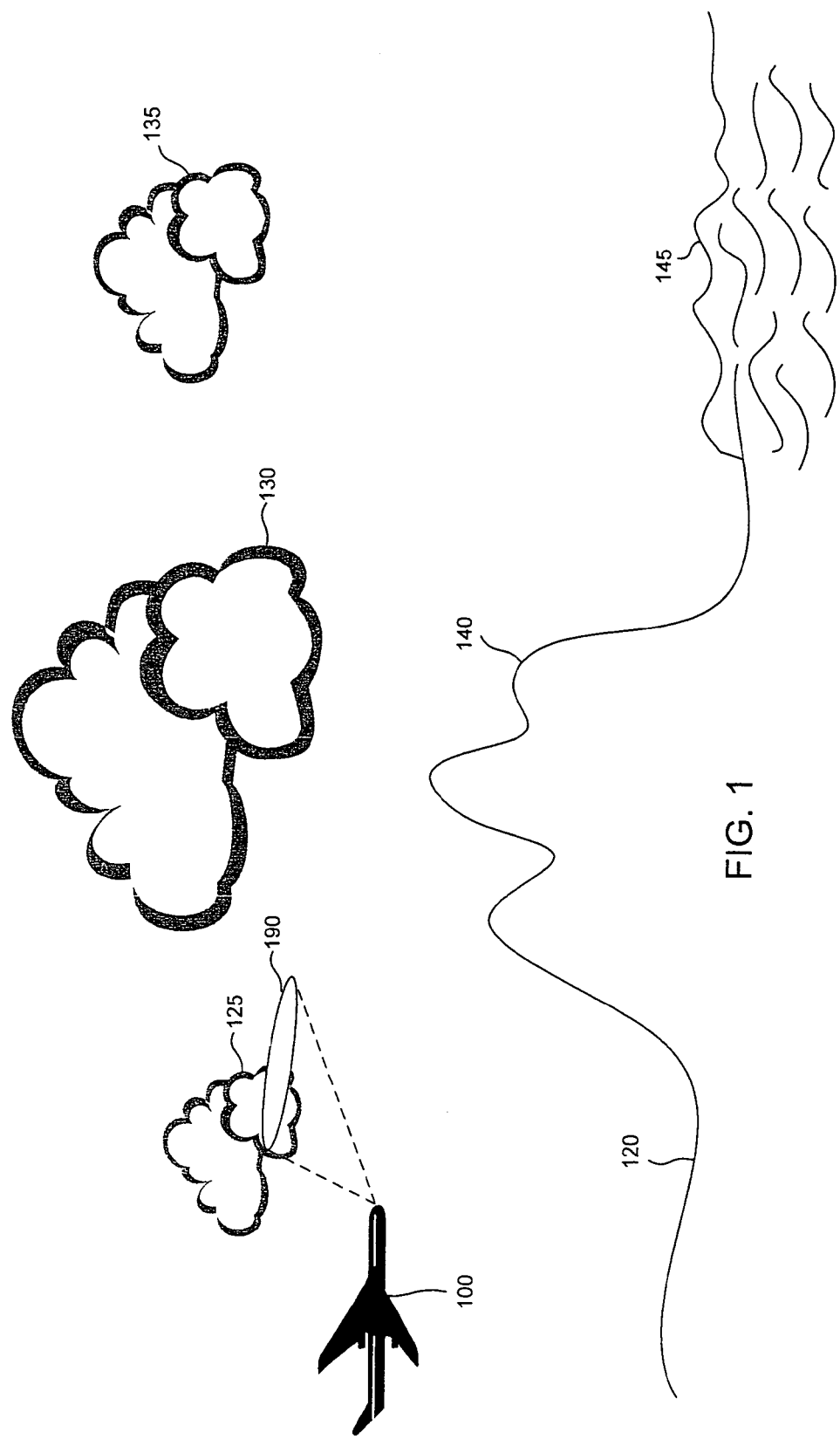
FIG. 1 is an exemplary diagram of an airplane having a weather radar system and flying in the atmosphere.

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In conventional continental aircraft systems, air carriers wish to detect threatening weather which may be a threat to the aircraft or passengers. However, in maritime environments, the air carriers attempt to identify weather which may be much milder since maritime carriers have many more available miles to fly, thus they may be able to circumvent any mild weather systems in the maritime environments in an attempt to provide increased passenger comfort.

Continental weather is driven by the heat capacity of the ground providing exceptional localized heating. In the maritime environment, however, the ocean or other water acts as a modulator of the heat, in other words, the water has a high energy capacity thus there is typically no strong localized convective regions. Further, in maritime weather systems, the clouds may be very tall, but there may not be a lot of energy in the cloud system which is contrary to continental weather in which pilots in the past have used weather height as an indicator of hazard. In other words, the higher in the atmosphere the cloud system, the more hazardous the weather system because it would appear that it would have taken more energy to get clouds at such an altitude. Further, in maritime weather because there is not a lot of updrafts when it starts to rain the cloud basically rains out at very low altitudes. Thus, by the time the cloud, even though it may be tall, gets to the altitude of a cruising airplane, there is very little for weather radar to detect. For example, between 35,000 and 36,000 feet, there is approximately 20 or 30 dB difference between the amount of radar return at mid-continental latitudes versus equatorial maritime systems. Thus, for the mid-latitude continental case, the thunderstorm may be very detectable, however, it may be well below the detectability capability of a weather radar in an equatorial maritime environment. Accordingly, an airborne radar system may be used to identify locations for the changing of radar thresholds in continental, maritime, or transitional regions, among other possibilities.

Referring to FIG. 1, an aircraft 100 is depicted having a radar on board capable of casting a radar beam 190 and receiving reflective energy from weather systems 125, 130, 135 and the like. Weather system 125 may be representative of a continental weather system. Weather system 130 may be representative of a continental convective weather system and weather system 135 may be representative of a maritime weather system which is over a maritime environment 145. Convective weather system 130 may be over a mountainous terrain 140, for example, and weather system 125 may be over a plain-like environment 120.

Figure 2:
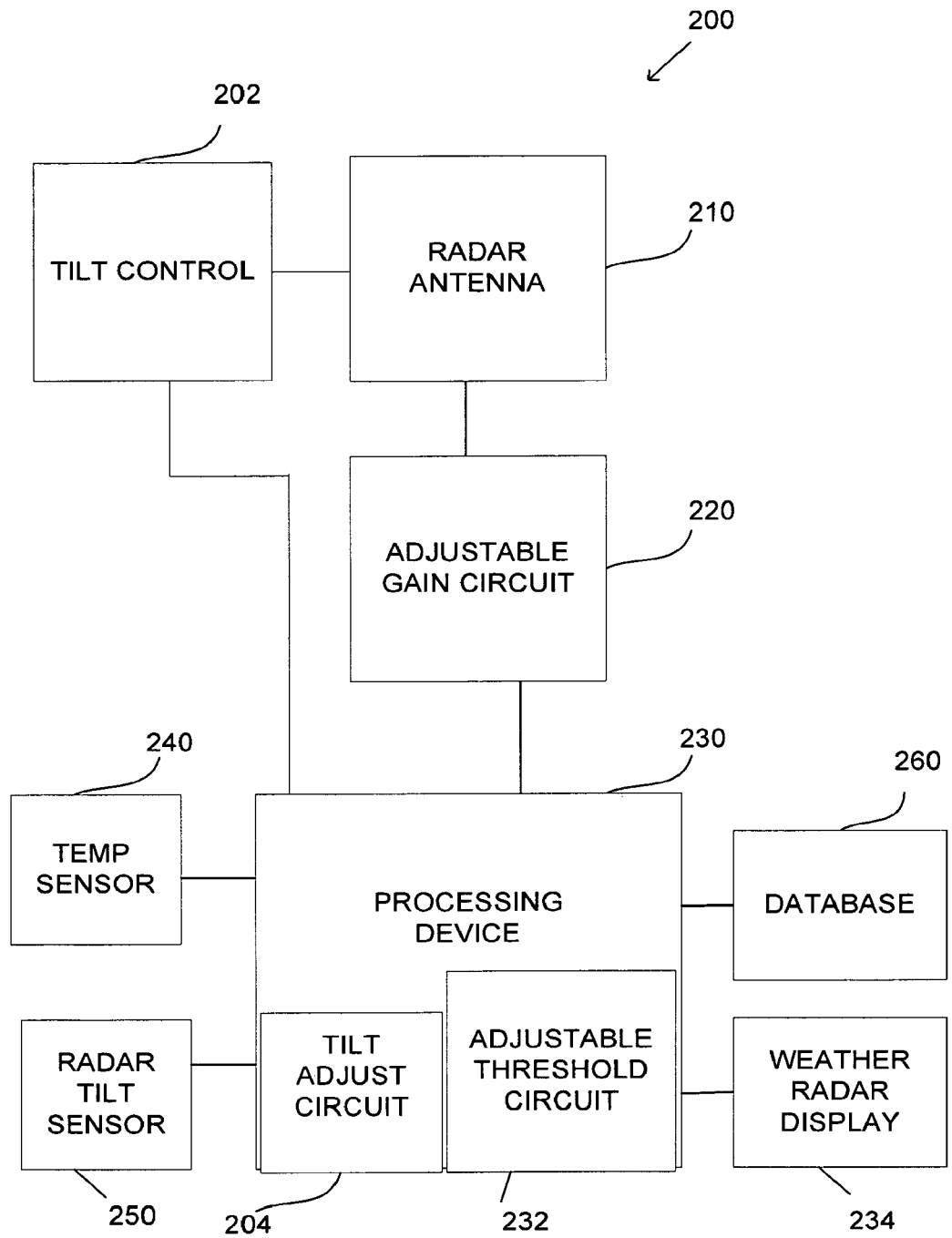
FIG. 2 is an exemplary block diagram of a radar system having an adjustable threshold circuit.

Referring now to FIG. 2, a radar system 200 includes a radar antenna 210 for sending and receiving radar signals. System 205 also includes an adjustable gain circuit 220 that is configured to change the gain of the radar signal provided to radar antenna 210. Processing device 230 receives temperature data from a temperature sensor 240 and radar tilt sensor 250. In an exemplary embodiment, processing device 230 also accesses a database 260 which contains information relating to the type of weather, including but not limited to continental weather, maritime weather, or transitional weather based on the location of the aircraft. Processing device 230 may also be configured with instructions which calculate and/or determine an appropriate adjustable threshold command via a control law which is based on the type of weather being observed. The adjustable threshold command is to be communicated to an adjustable threshold circuit 232 based on data supplied to processing circuit 230 such as but not limited to the weather type, temperature inputs, and the radar beam direction. Further, other information such as latitude, location, time of day, time of year, etc. may also be used to make the gain adjustment. Database 260 may be used to describe whether a specific location (i.e., latitude, longitude) is either a maritime or continental location. The database may be generated from a table of altitudes versus latitude/longitude. Also, sea level locations may represent maritime locations. Above sea level locations may be considered continental locations. Further, the generated database may be used to identify and remove ground clutter targets. For example, in continental environments, the entire sample field may be clutter, like for some antenna geometries. In this case, some terrain features may produce various radar returns. For situations where these terrain features produce radar returns, the database may be used as a source of clutter threshold information, to reduce terrain returns from the weather radar display. In maritime environments, small to large land masses may be embedded in what would otherwise be a maritime-like sample space. In this case, the clutter database may be used to reduce or remove radar returns from those land targets.

A threshold control law used in adjustable threshold circuit 232 may be based on whether the weather being displayed on display 234 is located in the continental, maritime, or transitional regions which is derived from information stored in database 260. The thresholds may be adjusted according to the weather type using adjustable threshold circuit 232, and thereby display, on display 234, the appropriate weather-hazard alert or condition. Other types of alerts may also be used and be based on the adjustable thresholds, including but not limited to a visual and aural warnings.

The radar returns may be normalized depending on the environment in which it is detected. This may be used for any type of weather radar that operates in a range of environments. This includes simple auto-tilt radars, manual radars, as well as fully automatic systems which use all possible environmental data including but not limited to the WXR-2100 multiscan radar available from Rockwell Collins of Cedar Rapids, Iowa.

In an alternative embodiment, system 200 may be used to control antenna tilt via tilt control 202 as well as thresholds. Often the reflectivity in maritime situations is lower than can be detected with conventional on-board weather radar hardware. However, as antenna tilt is lowered, weather below the aircraft is illuminated. At some point below the aircraft, radar reflectivity rises to the point where weather is detectable. If a range is given at which detection is desired, for example, 120 nautical miles, the weather model given by Zisper or alternative models may be used to compute the amount of down tilt via tilt adjust circuit 204 required to produce a detection. This may detect weather that does not extend to the aircraft's altitude, but low altitude weather will drop below the antenna beam and "fall off the display" at approximately the 40 to 80 nautical miles range, for example. The pilot can use the 100 nautical mile plus (or other long range) weather as cautionary while confirming the need to detour when weather does not drop out at shorter ranges.

In another exemplary embodiment, the radar system may be configured to slew smoothly between maritime and continental modes. For situations in which the radar environment is neither fully maritime nor fully continental, the percentage of the scanned area which is maritime verses continental is used to drive the threshold and antenna control logic to intermediate values. These values can be used for the entire sampled area or at each point within the sampled space. In addition, the database which supports this environmental decision process may have bits reserved to support individual maritime/continental decisions. As an example, consider coastal areas which are land, but the typical environmental airflow produces a maritime airmass above this point in space. Thresholds in this area should be maritime. In a similar manner, ocean areas which typically contain continental airmasses above them should have thresholds for them driven from the continental models. Dynamic selection of the nature of a point in space can be computed if the environmental wind flow is known. Points inland with airflow from ocean regions can be identified as ocean-like. Similarly, ocean situations that have their airflow blown in from continental areas may be identified as being continental in nature.

The database may further be used to bias the threshold process. Antenna beams which impinge on ground have their effective gain reduced during sampled ranges that have that interaction. This allows island and mountain situations to not be displayed to the pilot and allows increased weather detection characteristics in intervening areas between island, land or mountain areas. The gain reduction system differs from an editing system in that boundary values may be softened to reduce the effects of identification mistakes and still allow weather detection in the area influenced by land, island, or mountain targets.

In a similar manner, the thresholds used in multibeam clutter rejection processes may be modified by using the data base to improve weather detection margins and improve clutter removal robustness. This may allow lower antenna beam angle to interrogate weather while providing clutter rejection for precipitous terrain.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the radar system devices. For example, the type of device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of detecting weather using a weather radar onboard an aircraft at a location, the method comprising:
   receiving an indication of the location or area near the location of the weather radar; and
   changing a tilt angle of the weather radar to detect weather below an altitude of the aircraft at a selected range when the indication is associated with a maritime environment, wherein the tilt angle is changed to a lower angle than the tilt angle used for the selected range in a continental environment.

2. The method of claim 1, further comprising changing to the selected range from a longer range beyond the selected range, comparing radar returns from the selected range with radar returns from the longer range, and using the comparison to determine whether the weather located at the longer range is not also located at the selected range.

3. The method of claim 2, further comprising informing the pilot by graphically displaying that the weather detected at the longer range is not also located at the selected range.

4. The method of claim 1, further comprising consulting a terrain database to determine whether terrain features are within the selected range.

5. The method of claim 4, further comprising removing signals in a radar return corresponding to the terrain features.

6. The method of claim 1, wherein the tilt angle is based upon the selected range.

7. The method of claim 1, further comprising adjusting a threshold for at least one of the weather radar and a weather radar display when the indication is associated with a maritime environment.

8. A method of detecting weather events using a weather radar in an aircraft, the method comprising:
   receiving an indication of a location of the weather radar; and
   adjusting a tilt angle of the weather radar downward from a non-maritime tilt position to a maritime tilt position in response to the indication identifying the location as being associated with a maritime environment.

9. The method of claim 8, wherein the tilt angle is raised from the maritime tilt position when the indication identifies the location as associated with a land-based location.

10. The method of claim 8, wherein the tilt angle is raised from the maritime tilt position when the indication identifies the location as a coastal location.

11. The method of claim 8, wherein the weather radar is operated at a long range and a shorter range, wherein weather at the long range is cautionary and a need to detour the aircraft is confirmed by comparing radar returns from the long range and the shorter range to determine if the weather is detected at the shorter range when used in the maritime environment.

12. The method of claim 8, further comprising:
    determining whether the location is affected by a continental airmass and a maritime airmass; and
    changing the tilt angle to detect weather below an altitude of the aircraft at a selected range when the location is determined to be affected by both the maritime airmass and the continental airmass.

13. The method of claim 8, wherein the maritime tilt position is based upon a range of the weather radar and an extent to which the location is affected by a maritime environment.

14. The method of claim 8, further comprising informing a pilot of the aircraft of the detected weather events.

15. The method of claim 8, further comprising:
    determining whether terrain features are within a range of the weather radar; and
    removing signals in a radar return corresponding to said terrain features.

16. An airborne weather radar system that detects weather events in a location, comprising:
    a radar antenna, disposed upon an aircraft, and configured to detect weather events at a selected range; and
    a processor for setting a tilt angle of the radar antenna, the tilt angle being automatically lowered with respect to the tilt angle for a continental environment in response to the location being in a maritime environment.

17. The airborne weather radar system of claim 16, further comprising an alerting mechanism that alerts a pilot of the aircraft to the weather events detected using the radar antenna, the weather events being detected by operating in the marine environment at a first range and a second range, comparing radar returns from the first range and second range, and determining if the weather events are detected at the second range, the second range being less than the first range.

18. The airborne weather radar system of claim 17, wherein the alerting mechanism is a weather radar display.

19. The airborne weather radar system of claim 17, further comprising a terrain database containing information about terrain features within the first range, wherein the processor is configured to remove, from radar returns, signals corresponding to the terrain features.

20. The airborne weather radar system of claim 16, wherein the processor selects the tilt angle to detect weather events below an altitude of the aircraft.

* * * * *